United States Patent [19]

Yamauchi et al.

[11] 4,387,429
[45] Jun. 7, 1983

[54] FUEL INJECTION SYSTEM FOR INTERNAL COMBUSTION ENGINE

[75] Inventors: Teruo Yamauchi, Katsuta; Mamoru Fujieda, Nishiibaraki; Yoshishige Oyama, Katsuta, all of Japan

[73] Assignee: Hitachi, Ltd., Tokyo, Japan

[21] Appl. No.: 191,244

[22] PCT Filed: Jul. 20, 1979

[86] PCT No.: PCT/JP79/00191
§ 371 Date: Feb. 22, 1980
§ 102(e) Date: Feb. 22, 1980

[87] PCT Pub. No.: WO80/00267
PCT Pub. Date: Feb. 21, 1980

[30] Foreign Application Priority Data

Jul. 21, 1978 [JP] Japan ................................. 53-88463
Jul. 26, 1978 [JP] Japan ................................. 53-91993

[51] Int. Cl.³ .................... F02D 5/02; F02M 51/00; G05B 15/02
[52] U.S. Cl. .................... 364/431.05; 123/478; 123/480; 364/569
[58] Field of Search ................ 364/431, 442; 123/440, 123/480, 486, 490, 478, 485

[56] References Cited

U.S. PATENT DOCUMENTS

| | | | |
|---|---|---|---|
| Re. 29,060 | 12/1976 | Reddy | 123/485 |
| 4,130,095 | 12/1978 | Bowler | 123/440 |
| 4,151,815 | 5/1979 | Bramwell et al. | 123/486 |
| 4,153,014 | 5/1979 | Sweet | 123/490 |
| 4,155,332 | 5/1979 | Yaegashi et al. | 123/480 |
| 4,160,429 | 7/1979 | Morino et al. | 123/486 |
| 4,176,627 | 12/1979 | Bassi | 123/486 |
| 4,197,767 | 4/1980 | Leung | 364/569 X |
| 4,213,425 | 7/1980 | Read | 123/478 |
| 4,249,496 | 2/1981 | Shimazaki et al. | 123/440 X |
| 4,255,789 | 3/1981 | Hartford et al. | 364/431.06 |
| 4,257,377 | 3/1981 | Kinugawa et al. | 123/480 X |
| 4,259,723 | 3/1981 | Fujisawa et al. | 364/431.04 |

Primary Examiner—Felix D. Gruber
Attorney, Agent, or Firm—Antonelli, Terry and Wands

[57] ABSTRACT

A fuel injection system injects fuel to an internal combustion engine having a plurality of cylinders by means of a single fuel injector. For a four cylinder engine in which the suction stroke is repeated in the order of first, third, fourth and second cylinders, the single fuel injector responds to a control signal from a control system to initiate a single-shot injection upon the suction strokes of the first and the fourth cylinders. The fuel injection initiating timing as well as the injecting duration are arithmetically determined by a CPU a and ROM of the control system on the basis of the signals representative of operating conditions of the engine available from a hot-wire sensor, a crank angle detector, a temperature sensor, an $O_2$-sensor and supplied to the single fuel injector. The cylinders to which the fuel is to be injected are changed over from the first and fourth cylinders to the second and the third cylinders by the CPU in response to the signal output from the $O_2$-sensor.

25 Claims, 14 Drawing Figures

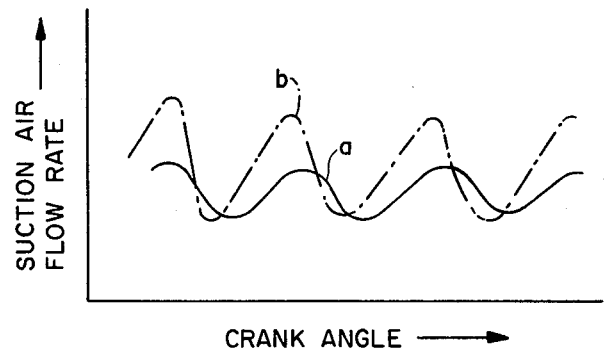
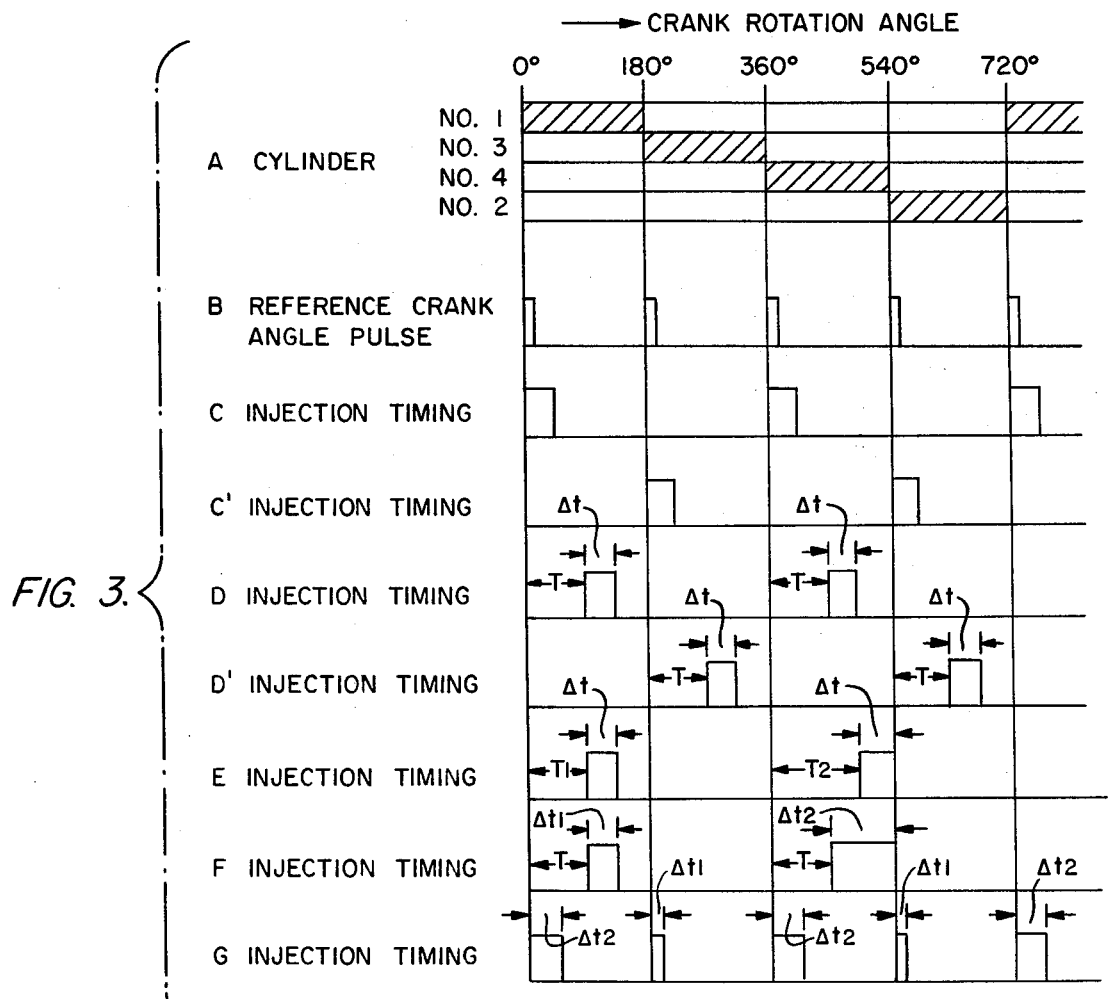

FUEL INJECTION SYSTEM FOR INTERNAL COMBUSTION ENGINE

FIELD OF THE INVENTION

The present invention relates generally to a fuel injection system for an internal combustion engine having a plurality of cylinders. In particular, the present invention is directed to an improvement of the fuel injection system of a single point injection type in which a single fuel injection device is provided in common to the plurality of cylinders.

BACKGROUND OF THE INVENTION

There has been long known a multi-point fuel injection system in which a fuel injector is provided for each of the cylinders, whereby fuel injection is effected to each of the individual cylinders independently from one another. The multi-point fuel injection system is effective for reducing the difference in the fuel quantity supplied to individual cylinders, to thereby enhance the fuel supply response characteristic of the fuel injection system in accelerating and decelerating operation modes by controlling with a high accuracy, the fuel quantity supplied to the individual cylinders.

However, since a plurality of expensive fuel injectors of high precision as well as an associated electronic control device are required corresponding to the number of the cylinders, the multi-point fuel injection system involves high manufacturing costs. Further, in order to attain a uniform fuel distribution to the individual cylinders, the fuel injectors have to be positioned properly at predetermined locations, which gives rise to the problem that the installing procedures as well as the maintenance and inspection become very complicated and troublesome.

As a measure for solving the above problems, there has been proposed a single-point fuel injection system in which a single fuel injector is disposed at the entry portion of an intake manifold of the engine and operated to inject fuel in an atomized state, whereby the resulting fuel air mixture is distributed to the individual cylinders in timing of the suction strokes thereof; (reference is made to U.S. Pat. No. 4,132,203 and the corresponding Japanese Laid-Open Patent Application No. 115411/1978).

The single-point fuel injection system is advantageous in that no more than one fuel injector or fuel injection valve device is required. However, because the fuel injection is effected for every suction stroke of all the individual cylinders, an expensive high speed type fuel injector which is capable of being operated reliably in response to the suction strokes of the individual cylinders is required, in order to supply the fuel air mixture having a uniform fuel air ratio over the entire operation range of the engine, which of course involves high costs to a disadvantage.

Further, in order to attain a uniform fuel distribution to the individual cylinders, the fuel injection initiating timing has to be set with a high accuracy, because otherwise, time lag may occur in the fuel supply to the cylinders, thereby making it difficult to attain a uniform fuel distribution.

For example, in the case of the single-point fuel injection system disclosed in U.S. Pat. No. 4,132,203, an arrangement is provided such that the fuel injection is initiated at a time point in advance of top dead center by 15° in terms of the crank angle for every suction stroke of the individual cylinders in an effort to attain a uniform fuel distribution thereto. However, it should be noted that a high suction air flow rate is available only during the latter half of the suction stroke. At a time point is advance of top dead center by 15° in terms of the crank angle, the air flow rate has been already reduced considerably.

Thus, the fuel injected at the time point at which the air flow rate is low cannot be supplied to the cylinders at a sufficient feeding rate and will undergo a delay, eventually resulting in non-uniform fuel distribution.

Further, the fuel injection is controlled by opening and closing an electromagnetic or solenoid valve. In this connection, it is noted that the maximum valve opening duration and hence the maximum fuel injection of the fuel injector which is adapted to effect the fuel injections for every suction stroke of the individual cylinders is previously determined in consideration of relation to other devices.

On the other hand, the operation characteristic of the electromagnetic valve is inherently such that the valve will not respond instantly to an actuation input signal, but will exhibit some delay in operation.

Consequently, in a high speed operation range of the engine in which the injection valve opening duration is set relatively short, the quantity of injected fuel will not be proportional to the injection valve opening time duration, but will become shorter, as compared with the engine operation in a low speed range in which the injection valve is opened for a relatively long time duration, and thus the influence of the electromagnetic valve to the proportional relationship between the valve opening duration of the fuel injector and the quantity of injected fuel can be neglected.

It is thus obvious that the prior art single-point fuel injection system such as disclosed in U.S. Pat. No. 4,132,203 in which fuel injection is effected for every suction stroke within the individual cylinders cannot avoid the disadvantage of non-uniform fuel distribution or a decreased fuel injection quantity in the high speed engine operation range due to the delay involved in the operation of the electromagnetic valve.

SUMMARY OF THE INVENTION

Accordingly, an object of the present invention is to provide an improved fuel injection system for an internal combustion engine which is immune to the drawbacks of the hitherto known fuel injection system described above.

Another object of the invention is to provide an improved fuel injection system for an internal combustion engine incorporating a plurality of cylinders in which the difference among fuel quantities fed to the individual cylinders is reduced to be as low as possible.

Still another object of the invention is to provide an improved fuel injection system for an internal combustion engine in which time lag or delay in the fuel transportation to the individual cylinders can be compensated in a satisfactory manner.

A further object of the invention is to provide a fuel injection system for an internal combustion engine which is capable of assuring the fuel quantity necessary and sufficient for the individual cylinders.

A still further object of the invention is to provide an improved fuel injection system for an internal combustion engine which is inexpensive and exhibits a high reliability.

A further object of the invention is to provide an improved fuel injection system for an internal combustion engine which can enjoy a long useful life.

According to an aspect of the invention, there is proposed a fuel injection system for an internal combustion engine having a plurality of cylinders in which a single fuel injection means is provided in a suction air metering system in communication with the plurality of the cylinders and operated to initiate fuel injection in intermittent synchronism with successive suction strokes of the cylinders.

According to another aspect of the invention, there is provided a fuel injection system for an internal combustion engine having a plurality of cylinders, in which a single fuel injection unit is disposed at a suction air metering system communicating with the plural cylinders and operated in synchronism with successive suction strokes of the cylinders, wherein the fuel injecting time duration is varied for each suction stroke of the individual cylinders.

By virtue of such an arrangement that the fuel injection is initiated in intermittent synchronism with the successive suction strokes of the cylinders, that is, for every other one of the successive suction strokes within the cylinders, a uniform fuel distribution to the individual cylinders can be accomplished over the entire operation range of the internal combustion engine inclusive of high and low speed operation ranges.

Further, by virtue of the above arrangement in which the fuel injection is initiated intermittently in synchronism with the suction strokes of the engine cylinders, the valve opening duration of the injection valve of the fuel injector can be set sufficiently longer than that of the hitherto known fuel injection valve, whereby a necessary and sufficient quantity of injected fuel can be produced through a single-shot injection without being subjected to the influences due to the delay in operation of the electromagnetic valve, which in turn means that an improved operation performance of the internal combustion engine is afforded.

By virtue of the arrangement such that the fuel injecting time duration is varied for each suction stroke of the individual cylinders, the problem of non-uniformity in the fuel distribution among the engine cylinders due to a lag in fuel supply can be successfully solved.

The other objects, novel features and advantages of the invention will become more apparent by examining the following description of the preferred embodiments of the invention made in conjunction with the accompanying drawings, in which:

BRIEF DESCRIPTION OF THE DRAWINGS

FIG. 2 shows graphically relationships between the crankshaft angle of the engine and the flow rate of suction air flowing through a suction air metering cylinder;

FIG. 3 is a timing diagram for illustrating relationships between the crankshaft rotation angle and the fuel injection timing of the fuel injection system according to the invention;

DETAILED DESCRIPTION

Figure 1:
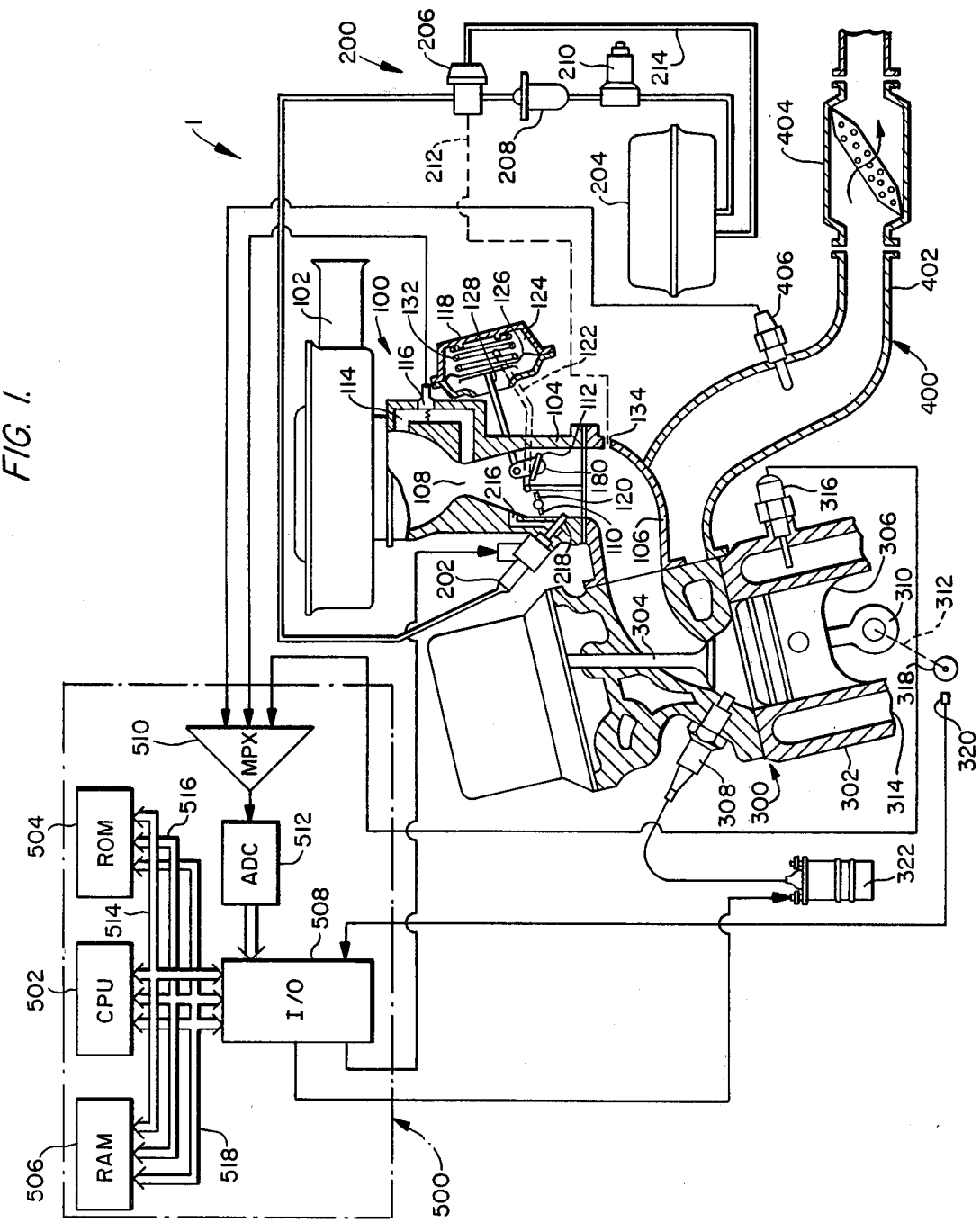
FIG. 1 shows schematically a general arrangement of a four-cycle four-cylinder engine provided with a fuel injecting system according to an embodiment of the invention.

FIG. 1 shows schematically the general arrangement of an internal combustion engine of a four-cycle/four-cylinder type.

Referring to FIG. 1, an internal combustion engine (hereinafter referred to simply as engine) 1 comprises in general a suction air metering system 100 for metering the quantity of suction or intake air, a fuel supply system 200 for supplying a metered quantity of fuel, atomized so as to form a gaseous mixture with the intake air, a combustion system 300 in which the gaseous fuel-air mixture undergoes combustion, an exhaust system 400 for discharging the gaseous combustion products to the atmosphere and a control system 500 which is electrically connected to these systems 100, 200, 300 and 400.

The intake air metering system 100 comprises an air cleaner 102 for purifying air as taken in from the exterior, a suction air metering cylinder 104 for adjusting the quantity of suction air in dependence on the operating conditions of the engine, and an intake air conduit 106 for connecting the intake air metering system 100 to the combustion system 300 mentioned above.

There is formed a venturi portion 108 in the suction air metering cylinder 104 with throttle valves 110 and 112 being disposed within the metering cylinder 104 downstream of the venturi 108. An air bypass passage 114 is formed in a side wall of the suction air cylinder 104 upstream of the throttle valves 110 and 112 and has an outlet port opened into the interior of the suction air metering cylinder 104 in the vicinity of the narrowest portion of the venturi 108. The inlet port of the air bypass air passage 114 is opened at a location upstream of the venturi 108.

Disposed in the air bypass passage 114 is a hot-wire sensor 116 constitutes an air flow detector. The electrical output terminal of the hot-wire sensor 116 is connected to the control system 500 mentioned above.

The throttle valve 110 is mechanically interlocked with the accelerator pedal of the motor vehicle and is adapted to be actuated by an operator or driver. On the other hand, the throttle valve 112 is arranged so as to be operated by a diaphragm device 118.

The diaphragm device 118 includes a negative pressure chamber 124 which is partitioned by a valve element 126 and supplied with a suction air pressure picked up by a pressure pick-up port 120 at an intermediate point between the venturi 108 and the throttle valves 110, 112 by way of a passage 122 indicated by a broken line. The valve element 126 constituted by a diaphragm is pivotally connected to a rotatable lever arm 130 at an end portion thereof through a connecting rod 128. The lever arm 130 is fixedly mounted on a rotatable shaft to which the throttle valve 112 is also fixedly secured. The valve element 126 is maintained constantly in a tensioned state under the influence of a coil spring 132 disposed within the negative pressure chamber 124.

The fuel supply system 200 comprises a single fuel injection valve device 202 for feeding fuel to the cylinder system 300 by way of the intake conduit 106 and a fuel tank or container 204 which is connected to the fuel injection valve device 202 through a pipe 212, a fuel pressure regulator 206, a filter 208 and a fuel pump 210.

The fuel pressure regulator 206 is connected to a pressure pick-up port 134 provided in the intake conduit 106 through a pipe 212 and on the other hand connected to the fuel tank 204 through a return pipe 212. By virtue of this arrangement, the feedback of fuel from the fuel pressure regulator 206 to the fuel tank 204 through the return pipe 214 is accomplished so that the difference between the pressure within the intake conduit 106 into which fuel is injected from the fuel injection valve device 202 and the pressure of fuel supplied to the fuel injection valve device is maintained at a predetermined constant level.

It will be noted that only a single injection valve device 202 is provided in the suction air metering cylinder 104 at a position in the vicinity of the outlet opening of a bypass branch passage 216 formed in the side wall of the suction air metering cylinder 104 and extending across the throttle valve 110. Formed around a pointed end portion of the fuel injection valve device 202 is a guide passage 218 which serves to guide the injected fuel into the intake conduit 106 in such manner that the injected fuel stream is enclosed by an air stream introduced through the branch passage 216.

Control of the fuel injection valve device 202 with respect to the injection timing as well as the fuel injection time duration is effected by an electric signal supplied to an electromagnetic or solenoid valve incorporated in the fuel injection valve device 202 from the control system 500, as will be hereinafter described in detail.

The combustion system 300 comprises charging valves 304 for charging the fuel air mixture from the intake conduit or manifold 106 into respective cylinders 302 each of which is provided with a piston 306 serving for compressing the fuel air mixture within the associated cylinder 302 and an ignition plug 308 for producing a spark to fire the compressed fuel air mixture for combustion, a crankshaft 312 connected to the piston 306 through respective piston rods 310, a crank angle detector 314 for detecting rotational angle of the crank shaft 312 and a coolant temperature detector 316 for detecting the temperature of the coolant or cooling water used for cooling the cylinders 302.

The crank angle detector 314 is composed of a crankshaft pulley 318 rotating together with the crankshaft 312 and a crank angle pick-up 320 and functions to produce a reference angle signal (CRC) for every reference crank angle and a position signal (CPP) for every predtermined angle (e.g. 0.5°) as a function of the revolution speed of the engine crankshaft. Both of these output signals from the crank angle detector 314 are supplied to the control system 500.

The ignition plugs 308 are electrically connected to an ignition coil 322 which, in turn, is electrically connected to the control system 500.

The temperature detector 316 is electrically connected to the control system 500.

The exhaust gas system 400 comprises an exhaust pipe 402 for discharging the exhaust gas resulting from the combustion of the fuel air mixture, and a catalyst tube 404 connected to the exhaust pipe 402 and containing therein catalysts for removing toxic gases such as CO, HC or the like, to thereby purify the exhaust gas.

Disposed in the exhaust pipe 402 upstream of the catalyst tube 404 is an $O_2$-sensor 406 which is electrically connected to the control system 500.

The control system 500 comprises a central processing unit 502 (hereinafter referred to as a CPU) for executing digital processing operations, a read-only memory or ROM 504 for storing control programs for the CPU 502 and fixed data, a random access memory or RAM 506 which allows data stored therein to be read-out as well as permitting data to be written therein, and an input/output interface circuit 508 having functions to receive input signals from the various sensors or detectors described above, to send the signals to CPU 502 and transfer data signals from CPU 502 to the fuel injection valve device 202 and the ignition coil 322.

The input signals to the input/output interface circuit 508 from the various sensors may be generally classified as follows:

Analog input signals available from the hot-wire sensor 116, the coolant temperature detector 316 and $O_2$-sensor 406.

Pulse train signals such as the reference angle signal (CRP) and the position signal (CPP) available from the crank angle detector 314.

The analog input signals are supplied to the input/output interface circuit 508 through a multiplexer (MPX) 510 for discriminating the input signals on a time division base and an analog-to-digital (A-D) converter 512 for converting the analog signals from MPX 510 into corresponding digital signals.

It will be noted that the pulse train signal CRP is produced for every 180° of crankshaft rotation in the case of the four-cylinder engine, for every 120° in the case of a six-cylinder engine and for every 90° in the case of an eight-cylinder engine. On the other hand, the position signal CPP may be produced for every 0.5° rotation of the crankshaft, for example.

The CPU 502, ROM 504, RAM 506 and the input/output interface circuit 508 are electrically connected to one another through a data bus 514, a control bus 516 and an address bus 518.

The signals from CPU 502 are fed to the fuel injection valve device 202 and the ignition coil 322 through the input/output interface circuit 508.

The fuel injection valve device 202 includes an electromagnetic or solenoid coil for actuating the incorporated electromagnetic or solenoid valve, one end of which coil is connected to a power supply terminal (not shown), while the other end is connected to the input/output interface circuit 508, whereby the electric current flow to the fuel injection valve apparatus 202 can be controlled.

Now, a description will be provided for the operation of the engine system 1 of the arrangement described above.

The suction air is introduced into the suction air metering cylinder 104 after having being purified through the air cleaner 102, whereupon a quantity of air is introduced into the bypass passage 114 in proportion to the suction air quantity due to a negative pressure produced at the venturi 108. Thus, the hot-wire sensor 116 is cooled, as a result of which an increased current is required to heat up the hot-wire sensor 116 to the predetermined temperature. On the basis of the electric energy supplied to the hot-wire sensor 116, the overall suction air quantity can be evaluated.

The analog signal from the hot-wire sensor 116 is selected through MPX 510 on a time division or sharing basis and supplied to the input/output interface circuit 508 after having been converted into a corresponding digital signal through A-D converter 512.

The relationship between the power demand (or current demands) of the hot-wire sensor described above and the quantity of suction air are previously stored in ROM 404, wherein the input signal representating such relationship and supplied to the input/output interface circuit 508 is utilized as the control signal for determining the timing for initiating the fuel injection through the fuel injection valve device 202 in a manner described hereinafter.

Suction air having passed through the venturi 108 flows into the intake conduit 106 through the throttle valves 110 and 112. In this connection, it is to be noted that operations of the throttle valves 110 and 112 depend on the operating or running condition of the engine 1, wherein only the throttle valve 110 is opened in a low speed range, while the throttle valve 112 is caused to open simultaneously with the throttle valve 110 in a high speed range under the control of the diaphragm device 118.

Since the suction air pressure prevailing in the intermediate zone between the venturi 108 and the throttle valves 110, 112 is picked up at the inlet port 120 and introduced into the negative pressure chamber 124 of the diaphragm device 118 through the passage indicated by the broken line, the connecting rod 128 will be then moved against the biasing force of the spring 132 when the negative pressure within the chamber 124 exceeds a predetermined negative pressure level. As a consequence, the lever arm 130 pivotally connected to the connecting rod 128 at the projecting end portion is rotated thereby to open the throttle valve 130 secured to the rotatable shaft of the lever arm 130.

Further, because of the hot-wire sensor 116 disposed within the bypass passage 114, the sensor 116 is protected from a high temperature gas produced upon occurrence of the back-fire or flash back in the cylinder 302. Additionally, the hot-wire sensor is also protected from being attacked by contaminants contained in the suction air.

The liquid fuel contained in the fuel tank 204 is pumped up by the fuel pump 210 and supplied to the fuel pressure regulator 206 after dust or the like or foreign particles have been removed through the filter. The fuel pressure regulator 206 responds to the pressure within the intake conduit 106 by way of the pressure conduit 206, to thereby adjust the pressure of fuel supplied to the fuel injection valve device 202.

The liquid fuel thus adjusted so as to have a predetermined difference relative to the pressure within the intake conduit 106 is injected into the intake conduit 106 in a quantity proportional to the valve opening duration of the fuel injection valve device 202. Because the time span during which the injection valve is opened is determined by the control system 500 in the manner described hereinafter, a quantity of the fuel proportional to the quantity of suction air is injected into the intake conduit in the atomized state to thereby form the fuel air mixture.

The fuel air mixture charged into the cylinder 302 through the charging valve 304 is compressed by the associated piston 308 and undergoes combustion ignited by the spark produced at the ignition plug 308, resulting in the reciprocation of the piston 306 within the cylinder 302 which is then translated into a corresponding rotational movement of the crankshaft 312.

The rotational angle of the crankshaft 312 is detected by the crank angle detector 314 which produces the reference angle signal CRP and the position signal CPP for every reference crank angle and every predetermined crank angle, e.g. 0.5°, respectively. Both of these signals are transmitted to the input/output interface circuit 508 of the control system 500 and utilized as the control signal for determining the timing for the initiation of the fuel injection through the fuel injection valve device 202 in the manner described hereinafter.

The cylinder 302 is cooled by the coolant or cooling water the temperature of which is measured by the coolant temperature detector. The signal representative of the measured temperature valve is suppled to the input/output interface circuit of the control system 500 through MPX 510 and A-D converter 512 to be utilized as the control signal for controlling the fuel injecting operation of the fuel injection valve device 202, as will be described hereinafter.

The ignition plug 308 is supplied with a high voltage from the ignition coil in a proper ignition timing. The control input signal to the ignition coil 322 is supplied from CPU 502 through the input/output interface circuit 508.

The exhaust gas resulting from the combustion is introduced to the exhaust gas pipe 402 and discharged to the atmosphere after the removal of toxic components such as CO, HC or the like under the action of the catalyst tube 404.

The $O_2$-sensor 406 disposed in the exhaust pipe 402 upstream of the catalyst tube 404 serves to detect the composition of the exhaust gas. The output signal from the $O_2$-sensor thus represents the state of the fuel supply conditions in the engine, i.e. whether the fuel air ratio of the fuel air mixture is optimum or not and is sent to the input/output interface circuit 508 of the control system 500 through MPX 510 and the A-D converter 512 to be utilized as the control signal for controlling the fuel injecting operation of the fuel injection valve device 202 in the manner described hereinafter.

CPU 502 executes digital processing operations for the control of fuel injection in accordance with the various signals from the individual sensors or detectors described above. There are stored in ROM 504 a program for controlling the fuel injection together with data of optimum injection timing characteristics which are required upon execution of the above program. The term "optimum injection timing characteristic" is intended to mean the fuel injection timing which is optimum for attaining uniform distribution of fuel to the individual engine cylinders in dependence on the operating or running conditions of the engine 1.

The data of the optimum injecting timing characteristic is stored in ROM so that the data can be read out through a map retrieval upon fetching the signals representative of the engine operating conditions.

By the way, the input/output interface circuit 508 fetches the signals representing the engine operating conditions, such as the air flow rate signal derived from the hot-wire sensor 116, and the reference angle signal CRP and position signal CPP from the crank angle detector 314, for example, and then transfers these signals to CPU 502 wherein the injection timing as well as the injection time duration are determined through arithmetic operations based upon the supplied measurement signals so as to attain the optimum fuel distribution described above. The pulse or discrete signal thus produced from CPU 502 and representing the injection timing and the injection time duration is supplied to the fuel injection valve device 202 as the control signal therefor.

More specifically, CPU 502 responds to the signals representative of the operating conditions of the engine 1 and reads out from ROM 504 the data of the optimum injection timing corresponding to the required quantity of fuel injection through a map retrieval. The operating conditions which constitute the prerequisites for determining the injection timing are represented by the data such as the suction air flow rate, the crank angle, the coolant temperature or the like.

Accordingly, the timing for opening the solenoid valve of the fuel injection device 202 literally corresponds to the injection initiating timing which is determined through the processing operations in CPU 502, while the time point at which the fuel injection valve is closed corresponds to the termination of the fuel injecting duration.

Although it has been assumed that data of the optimum fuel injection timing characteristic required for attaining the uniform fuel distribution to the individual cylinders is obtained from ROM 504 through the map retrieval, it will be appreciated that similar effect can be attained also by determining the optimum injection timing from the demanded quantity of fuel injection through the operation of CPU 502.

Next, description will be provided of the control operations for determining the fuel injection initiating timing and the fuel injecting time duration (i.e. the time span during which the fuel injection valve of the device 202 is opened) of the fuel injection valve device in the engine system of the arrangement described in the foregoing.

Referring to FIG. 2 which illustrates graphically relationships between the crank angle of the engine 1 and the suction air flow rate at the venturi 108 with the revolution number of engine being adopted as a parameter, a solid curve a represents the relationship in the case where the engine 1 is operated at a low rotation speed, while a broken curve b represents the engine operating conditions at a high rotation speed. As can be seen from FIG. 2, the suction air flow rate varies in dependence on the revolution speed of the engine crankshaft and the crank angle. The quantity of suction air in a single suction stroke is proportional to the area of one wave profile.

In view of the above facts, the suction air flow rate is detected by the hot-wire sensor 116 every predetermined increment in the crank angle of the engine crankshaft. The output signal from the hot-wire sensor 116 is fed to CPU 502 through multiplexer 510, ADC 512 and the input/output interface circuit 508 together with the signal representing the engine revolution speed as detected by the crank angle detector 314. On the other hand, ROM 504 stores therein the data of the optimum fuel injection timing for an improved fuel distribution to the engine cylinders in correspondence to the two variables of the suction air flow rate and the engine crankshaft speed. On the basis of these data stored in ROM 504, the optimum fuel injection timing as well as injection duration required for the uniform distribution of the fuel to the individual cylinders are determined in accordance with the control program. The control for opening and closing the fuel injection valve device 202 is effected by the signal representative of the values thus determined.

Since the suction air flow rate signal measured at the predetermined crank angle is likely to undergo variations due to deviations in the operation timings of the charging valves and the discharging valves of the engine cylinders, a variation in the internal pressure of the exhaust pipe 402 or the like factors, the ratio of oxygen content of the exhaust gas is detected by the $O_2$-sensor 406 disposed in the exhaust pipe 402 and utilized to correct the fuel injecting time duration.

FIG. 3 illustrates relationships between the fuel injection timing for the fuel injection valve device 202 and the crank rotation angle for the four-cylinder engine system 1 shown in FIG. 1.

Referring to FIG. 3, at A, the crank rotation angle of the crank shaft 312 of the engine 1 is plotted along the abscissa, while the order of the suction strokes in the individual engine cylinders is plotted along the ordinate with the suction stroke of the individual cylinders being indicated by hatched areas.

As can be seen from FIG. 3, at A, the suction strokes of the engine 1 take place for every 180° of the crank angle. More specifically, the suction stroke of the cylinder labelled with No. 1 takes place in the range of the crank angle from 0° to 180°. The suction stroke of the third cylinder No. 3 occurs in the crank angle range from 180° to 360°, while that of the fourth cylinder No. 4 takes place in the angular range between 360° and 540°. The suction stroke of the second cylinder No. 2 occurs in the crank angle range from 450° to 720°. The suction strokes of the individual cylinders are further repeated in this order.

In FIG. 3 at B, there are shown the pulses of the reference crank angle signal produced by the crank angle detector 314 every time when the crank angle increases by 180°.

In the fuel injection valve device according to the illustrated embodiment of the invention, the fuel injection is initiated in intermittent synchronism with the appearance of the reference crank angle pulses as is illustrated in FIG. 3. at C or C'. In other words, the fuel injection is initiated in synchronism with the beginning of every other suction stroke in the series of successive suction strokes in the individual cylinders in the order described hereinbefore. By virtue of such selection of the injection timing, the time duration which is necessary and sufficient for the fuel injection through the fuel injection valve device 202 can be assured, rendering it unnecessary to provide an expensive fuel injection device of a complicated structure. In other words, it is possible to use an inexpensive conventional fuel injection device. Additionally, because the influence due to the delay in operation of the solenoid valve incorporated in the fuel injection device 202 is overcome, a proper or uniform distribution of fuel to the individual engine cylinders can be accomplished. In addition, since the frequency at which the fuel injection is carried out is reduced to a half of the injection frequency required in the hitherto known system, the useful life of the fuel injection device as well as the associated elements will be significantly increased.

In this connection, it should be noted that the fuel injecting duration of the fuel injection device 202 is determined on the basis of the results of the processing operations of the measured data executed by the control system 500, which will be hereinafter described in detail.

In the fuel injection performed in the intermittent synchronism with the injection timing pulses, i.e. the reference crank angle signal pulses as described above, it is necessary to take into consideration the time point at which the fuel injection is initiated in view of the variation in the suction air flow rate shown in FIG. 2.

After various experiments, the inventors of the present application have found that the fuel injection is more effectively initiated at the time of the high air flow rate, that is, after a predetermined time (or angle) T from the reference crank angle pulse has elapsed as indicated in FIG. 3 at D or D'.

When the fuel injection timing is so set that the fuel injection takes place once for every two successive suction strokes as described above, the valve opening duration of the fuel injection valve device 202 can be adequately assured, whereby the uniform fuel distribution to the individual engine cylinders can be accomplished over the entire operation range of the engine.

Figure 4:
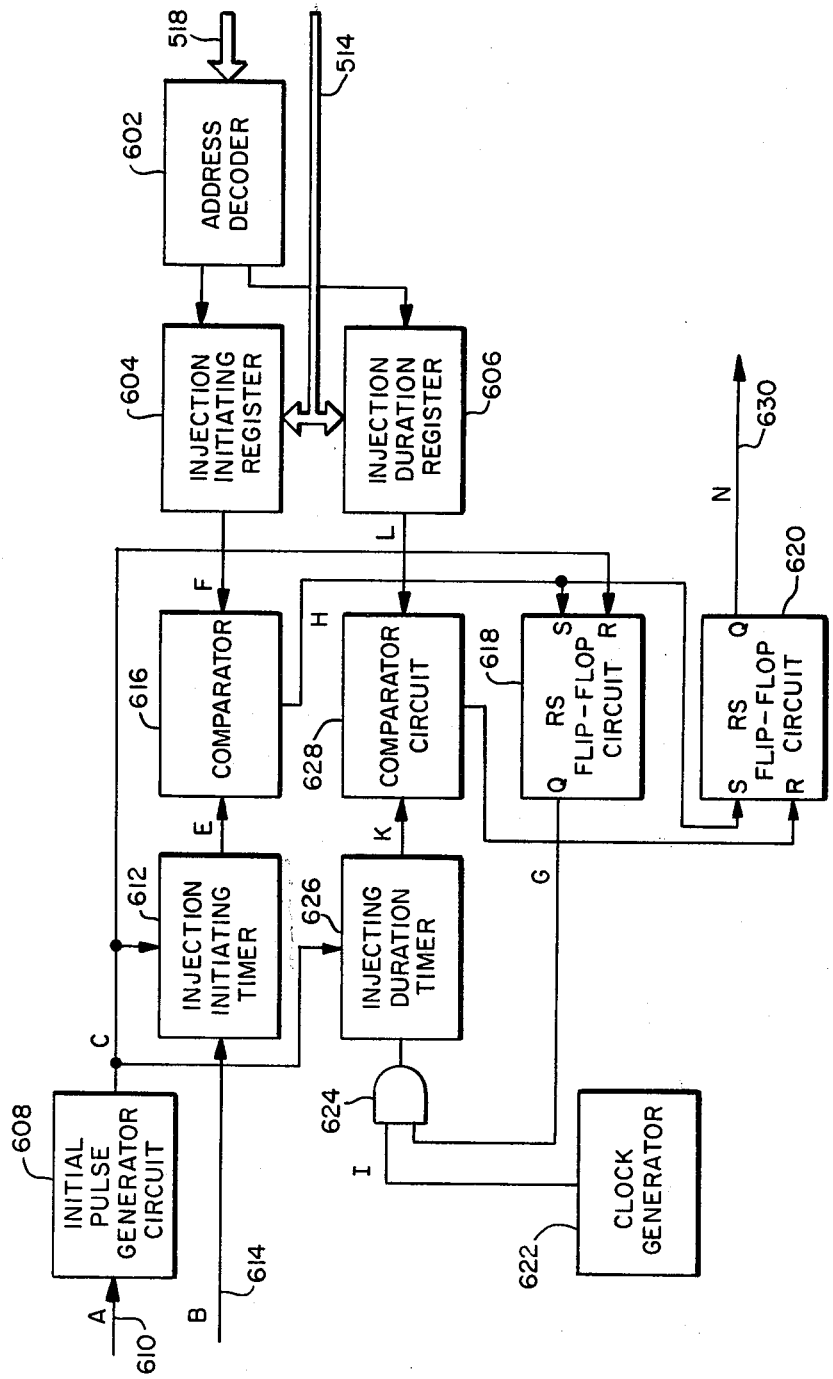
FIG. 4 is a block diagram of a circuit configuration of a control circuit for controlling the fuel injection timing of the fuel injection system according to the invention.
Figure 5:
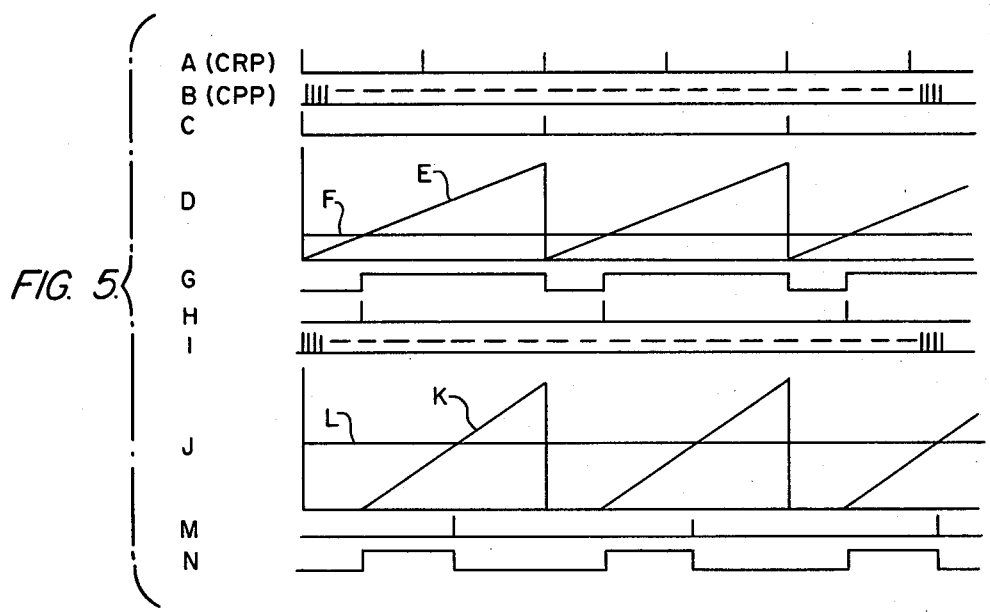
FIG. 5 is a signal diagram to illustrate various signals appearing at various circuit points of the circuit shown in FIG. 4.

Next, the fuel injection initiating timing as well as the fuel injecting duration will be described in conjunction with the injection control circuit 600 shown in FIGS. 4 and 5 for setting these factors at the fuel injection valve device 202. The injection control circuit 600 shown in FIG. 4 is incorporated in the input/output interface circuit 508 of the control system 500 shown in FIG. 1. FIG. 5 illustrates signal waveforms of various signals produced at various circuit points of the circuit shown in FIG. 4. The correspondence between the signals and the circuit points at which they occur is identified by the same reference letters except for D and J.

Referring to FIG. 4, an address decoder 602 is connected to CPU 502 through the address bus 518. When the address signal output from CPU 502 is supplied to the address decoder 602, an injection initiating register 604 and an injecting duration register 606 are designated.

The injection initiating register 604 and the injection duration register 606 are connected to CPU 502 through the data bus 514. The injection initiating register 604 serves to store therein the optimum fuel injection timing data for the improved fuel distribution ratio as determined by CPU 502 in dependence on the operating conditions of the engine. On the other hand, the injection duration register 606 stores therein the fuel injecting duration data for a calculated fuel injection quantity as determined by CPU 502 in consideration of the engine operating conditions.

An initial pulse generator circuit 608 produces an initial pulse shown in FIG. 5 at C for providing a reference time point for the fuel injection initiating timing from the reference crank angle pulse signal CRP (shown in FIGS. 3 and 5 at B and A, respectively) supplied to the input terminal 610. It should be noted that the initial pulse corresponds to the upper dead point (top dead center-TDC) of the pistons in the associated cylinders.

An injection initiating timer 612 serves to count the position signal pulses CPP (refer to FIG. 5 at B) supplied to the input terminal 614 from the crank angle detector 314 to thereby produce a time signal E shown in FIG. 5 at D. The injection initiating timer 612 is supplied with the output pulse signal from the initial pulse generating circuit 608 as a reset signal.

The output signal E from the injection initiating timer 612 is supplied to the comparator 616 together with the output signal F from the injection initiating register 604. The output signal F from the injection initiating register 604 is set so as to be utilized as the reference value for comparison in the comparator 616 as indicated by the signal F in FIG. 5 at D.

Consequently, when the count output E from the injection initiating timer 612 increases beyond the output signal F from the injection initiating register 604, the comparator 616 produces an output pulse shown in FIG. 5 at H. The output pulse signal H from the comparator 616 is applied to a set terminal of RS flip-flop circuit 618 which serves for providing one of the conditions for determining the injecting time duration and at the same time to a set terminal of RS flip-flop circuit 620 which functions to produce a control pulse signal for controlling the injection initiating timing and the injecting time duration.

In response to the set input signal H, the RS flip-flop circuit 620 produces a high level output at the output terminal Q as shown in FIG. 5 at N. The leading edge of the high level output signal N corresponds to the injection initiating time point at which the actuator solenoid of the fuel injection valve device 202 is energized to start the valve opening operation.

The RS flip-flop circuit 618 responds to the set input signal H for producing the signal G (FIG. 5) from the terminal Q thereof. The appearance of the output signal G coincides with the beginning of the fuel injecting duration. More specifically, an AND gate 624 having an input terminal supplied with a clock pulse I (shown in FIG. 5 at I) from a clock generator 622 is opened in response to the output signal G applied to the other input terminal of the AND gate 624, whereby the clock pulse I is conducted to the injection duration timer 626. The RS flip-flop circuit 618 is reset by the output pulse from the initial pulse generator circuit 608.

The injection duration timer 626 operates to count the clock pulses shown in FIG. 5 at I thereby preparing a duration time signal K shown in FIG. 5 at J. This timer circuit 626 is brought to the set state by the output signal from the initial pulse generator circuit 608. The output signal K from the injecting duration timer 626 is applied to one input of the comparator circuit 628 which has its other input terminal supplied with the output signal L (refer to FIG. 5 at J) from the injection duration register 606 to serve as the reference value for comparison in the comparator 628.

Thus, when the count output signal K from the injecting duration timer 626 equals the output level L from the injection duration register 606, the comparator 628 produces an output pulse shown in FIG. 5 at M. The output pulse signal M is applied to a reset terminal R of the RS flip-flop circuit 620 which is then returned to the reset state.

The RS flip-flop 620 is so arranged that the output signal G is produced in response to the set value in the injection initiating register 604 and has a time duration until the termination of the set value of the injection duration register 606. Thus, the output signal N (refer to FIG. 5) produced at the output terminal 630 of the RS flip-flop circuit 620 constitutes the control signal for the fuel injection valve device 202 which signal determines the timing or time points for initiating the fuel injection as well as the injecting time duration by responding intermittently or alternately to the successive suction strokes of the engine 1. The valve opening timing or time point and the valve opening duration of the fuel injection valve device 202 are set by the control signal.

The output pulse signal N (refer to FIG. 5 at N) is applied to the base electrode of a drive transistor of a drive circuit (not shown) for the fuel injection valve device, to thereby turn on the drive transistor for actuating the valve opening operation of the fuel injection valve device 202.

As will be appreciated from the above description, the injection control signal for controlling the fuel injection timing as well as the fuel injecting time duration which are determined by CPU 502 to be optimum for attaining the uniform fuel distribution to the individual cylinders is provided by the output signal from the RS flip-flop circuit 620 which is controlled by the time signals or angle signals produced from the comparators 616 and 628 which serve to compare the output signals from the injection initiating register 604 and the injection duration register 606 with the count outputs from the injection initiating timer 612 and the injecting duration timer 626, respectively.

In this manner, the fuel injection control signal is caused to constantly correspond to the current operating conditions of the engine 1 under the control of CPU 502 to obtain the optimum fuel injection timing and the injection duration. Consequently, the valve switching control for the fuel injection valve device 202 is performed so as to make the fuel distribution ratio among the individual cylinders uniform.

Figure 6:
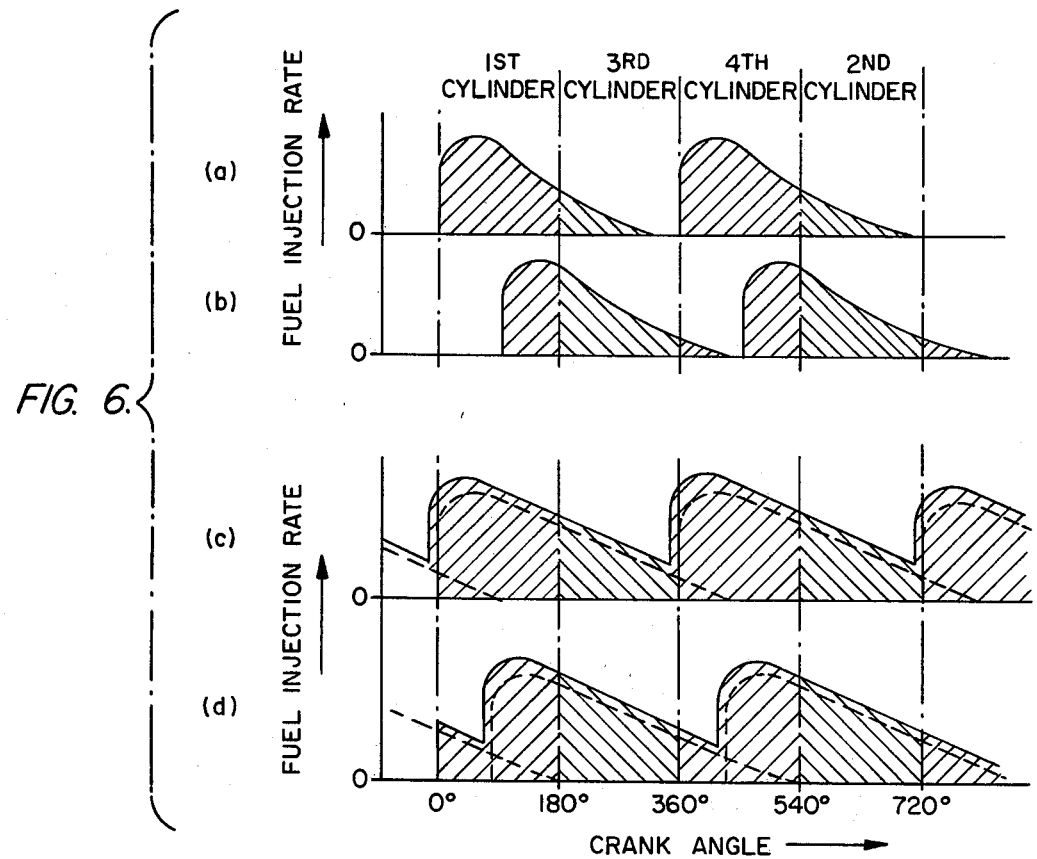
FIG. 6 graphically illustrates experimentally obtained data for the relationship between the crankshaft angle and the fuel injecting speed in the fuel injection system according to an embodiment of the invention.

FIG. 6 illustrates graphically the experimental results concerning the relationship between the crank angle and the fuel injecting rate or speed as obtained in a trial fuel injection valve device constructed according to an embodiment of the invention.

In FIG. 6, graph (a) shows the experimental results obtained when the fuel injection is initiated in synchronism with the initiations of the suction strokes in the first and fourth cylinders, i.e. the upper dead points of these cylinders among the successive suction strokes repeated in the order of the first, third, fourth and the second cylinders.

In FIG. 6, graph (b) shows the experimental results obtained when the fuel injection is initiated after a predetermined time lapse or crank angle from the upper dead point in the suction stroke of the first and fourth cylinders, respectively. It will be understood that the areas of the hatched regions in the illustrated graphs represent the quantities of fuel supplied to the associated cylinders.

As can be seen from the graph (a) shown in FIG. 6, the quantities of fuel supplied to the first and the fourth cylinders become slightly larger than those supplied to the second and the third cylinders, when the fuel injection is initiated in synchronism with the upper dead points in the suction strokes of the first and fourth cylinders. This is because the air flow rate is inadequate at that time.

In contrast thereto, when the fuel injection is initiated after a predetermined time lapse or crank angle from the upper dead points in the suction strokes of the first and the fourth cylinders, the fuel is supplied uniformly to all the individual cylinders as can be seen from the graph (b) shown in FIG. 6, because the injected fuel is carried by the air stream of a sufficiently high flow rate of speed and is transported to the individual cylinders.

The same applies to the case in which the engine is operated at a high revolution speed. More particularly, as the revolution or rotation speed of the engine is increased, a larger quantity of fuel is required. This, in turn, means that the span (or time duration) during which the fuel is injected is increased.

Consequently, the fuel supplied through the single shot injection tends to flow across the suction strokes of the individual cylinders, as is in the case represented by the graph (a).

In FIG. 6, a graph (c) shows the experimental results obtained when the fuel injection is initiated in synchronism with the upper dead points in the suction strokes of the first and the fourth cylinders in the case of a high speed operation of the engine described above. The above comments in conjunction with the graph (a) shown in FIG. 6 apply also to this case.

In FIG. 6, a graph (d) shows the experimental results obtained by delaying the fuel injection initiating timing or time point for a predetermined crank angle or a time from the upper dead point in the suction strokes of the first and the fourth cylinders, as in the case described above in conjunction with the graph (b). It can be seen that the uniform distribution of fuel to the individual cylinders has been attained.

In the graphs (c) and (d) shown in FIG. 6, the broken line profile indicates the distribution of fuel introduced through the single shot injection, while the solid line profile indicates the distribution of fuel quantity added with the remaining fuel flow of the preceding injection.

The injection initiating timing (or time point) for equalizing the fuel distribution to the individual cylinders, i.e. the injection timing with a delay corresponding to a predetermined crank angle or time lapse from the upper dead point in the suction stroke of the first and the fourth cylinders for attaining the optimum fuel distribution to the individual cylinders, is experimentally determined beforehand and stored in ROM 504 of the control system 500 shown in FIG. 1. In the actual operation of the engine, the data of the fuel injection initiating timing is read out from ROM 504 to be utilized to establish actually the optimum injection timing described above.

Figure 7:
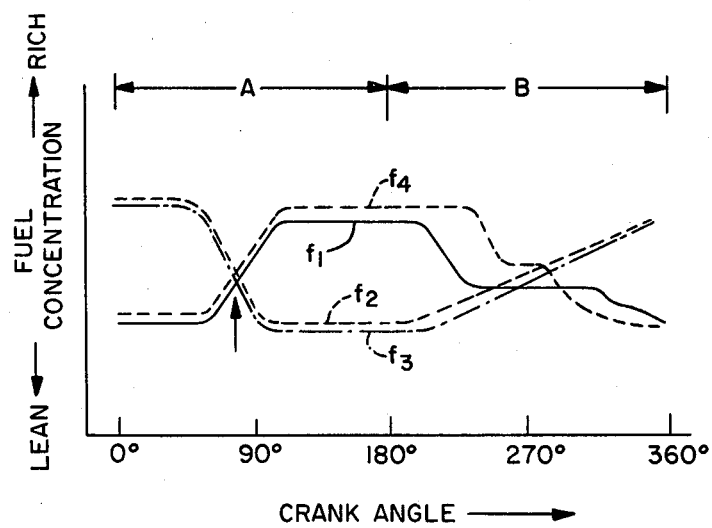
FIG. 7 graphically illustrates experimentally obtained data for fuel injection initiating timing in the fuel injection system according to an embodiment of the invention.

FIG. 7 is a diagram to illustrate exemplary values for the predetermined crank angle which are experimentally determined.

In the figure, the fuel concentration of fuel air mixture samples is plotted along the ordinate, while the crank angle is plotted along the abscissa.

For convenience' sake of experiment, graphs illustrated in FIG. 7 show variations in the concentration of the fuel air mixture as a function of the crank angle in two stages A and B. In stage A, the fuel injection is initiated in synchronism with the ignition and explosion strokes of the first and the fourth cylinders, while in the stage B, the fuel injection is initiated in synchronism with the ignition and explosion strokes of the second and the third cylinders.

It should be noted that since the ignition and explosion stroke differs from the suction stroke illustrated in FIG. 6 by 180° in the crank angle, the varying direction of the fuel concentration shown in FIG. 7 must be reversed when read in conjunction with FIG. 6.

In FIG. 7, a solid line curve $f_1$, a thick broken line curve $f_2$, a dotted-broken line curve $f_3$ and a thin broken curve $f_4$ represent variations in the fuel concentration of the mixture fed to the first cylinder No. 1, the second cylinder No. 2, the third cylinder No. 3 and the fourth cylinder No. 4, respectively.

As can be seen from the graphs shown in FIG. 7, the point at which the concentrations of the fuel air mixtures supplied to the first to the fourth cylinders substantially coincide with one another is present in the vicinity of the crank angle of 90° in the suction strokes of the first and the fourth cylinders, as indicated by the arrow.

Accordingly, when the crank angle at which the fuel concentrations of the mixtures fed to all the individual cylinders, e.g. the crank angle of 90°, is stored previously in ROM 504, a uniform fuel distribution to the individual cylinder can be attained.

It should be mentioned, however, that the crank angle at which the fuel concentrations of the fuel-air mixture is supplied to the individual cylinders undergoes influences exerted by various factors such as configuration of the combustion chambers, shape of the intake manifold, magnitude of overlaps between the operations of the charging and the discharging valves, revolution number of engine, pressure in the intake conduit or manifold and so forth.

In view of this fact, it is proposed to experimentally determine the crank angle in question and store the corresponding data in a memory such as a ROM in order to assure optimum fuel injection initiating timing or time points.

The foregoing description has been made on the assumption that the fuel injection is initiated in synchronism with the suction strokes of the first and the fourth cylinder in the case of the four-cycle four cylinder engine in which the suction strokes are repeated in the order of the first, the third, the fourth and the second cylinders. However, it will be appreciated that there may arise a case where the fuel injection should be preferably initiated in synchronism with the suction strokes of the second and the third cylinders when the engine operating conditions require such replacement.

More specifically, in the actual arrangement of the individual cylinders in a four-cycle four-cylinder engine, the cylinders are divided into two groups which communicate with each other, as is schematically shown in FIG. 8. Consequently, the manner in which the fuel injected in timing with the suction stroke of certain cylinders is distributed to the individual cylinders will become different in dependence on the particular cylinders whose suction stroke is utilized as the reference for the synchronous fuel injection.

Figure 8A:
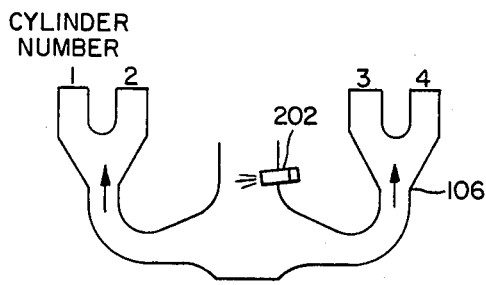
FIGS. 8A and 8B show schematically arrangements of four engine cylinders to which the injected fuel air mixture are fed.

For example, when the fuel injection is effected in synchronism with the suction strokes of the first and the fourth cylinders in the four-cycle four-cylinder engine in which the suction strokes of the individual cylinders take place in the order of the first, the second, the third and the fourth cylinders, as is in the case illustrated in FIG. 8A, a fraction of the fuel injected at the suction stroke of the first cylinder will flow into the third cylinder. In a similar manner, a part of the fuel injected at the suction stroke of the fourth cylinder will flow into the second cylinder, which means that the fuel, i.e. the fuel air mixture in the strict sense is divided at the entrance to the intake manifold 106.

Figure 8B:
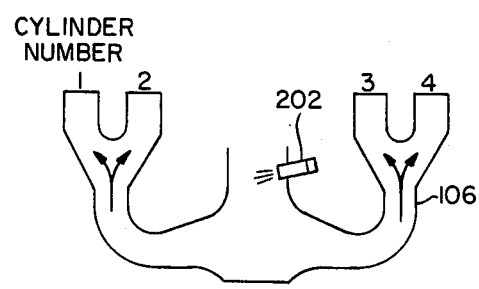

On the other hand, when the fuel injection is carried out in synchronism with the suction strokes of the second and the third cylinders, a part of the fuel injected at the suction stroke of the second cylinder will flow into the first cylinder, as is schematically illustrated in FIG. 8B. In a similar manner, a fraction of the fuel injected at the suction stroke of the third cylinder will flow into the fourth cylinder. This means that division of the injected fuel takes place between the adjacent cylinders.

The inverse division of the fuel air mixture flow at a branch or entry portion of the intake manifold 106 is suited for a low speed operation of the engine, because a sufficient time for vaporizing the fuel can be than assured.

On the other hand, the division of fuel flow between the adjacent cylinders as illustrated in FIG. 8B represents an effective injected fuel distribution pattern for a high speed operation of the engine which requires the fuel charge at a high frequency with a reasonable accuracy for the individual cylinders.

In this manner, in dependence on the engine operating conditions, a selection is made as to whether the initiation of the fuel injection should be synchronized with the suction strokes of the first and the fourth cylinders or those of the second and the third cylinders.

Such a selection of the fuel injection modes can be realized by utilizing the output signal from the $O_2$-sensor disposed in the exhaust pipe 402 shown in FIG. 1.

Figure 9:
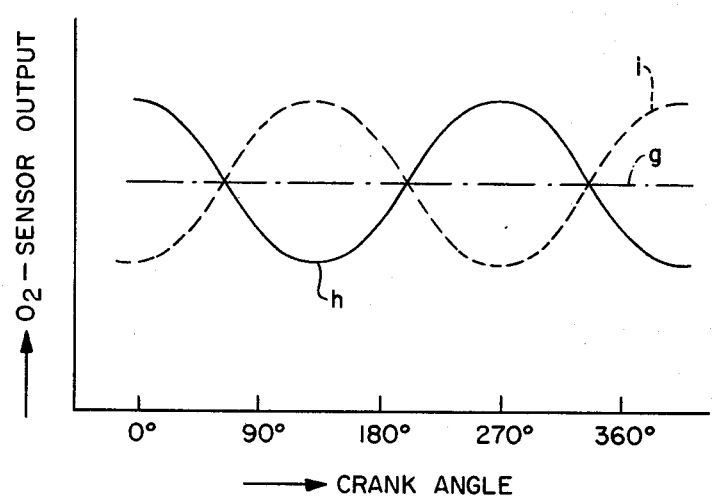
FIG. 9 graphically illustrates experimentally obtained data for relationships between the crankshaft angle and output signals from an $O_2$- sensor.

FIG. 9 graphically illustrates the relationship between the crank angle and the output signal from the $O_2$-sensor. A dotted-broken line g represents the optimum value (constant) of the output from the $O_2$-sensor over the entire crank angle which is previously stored in ROM 504 of the control system 500 shown in FIG. 1.

Now, assuming that the output from the $O_2$-sensor is varied as indicated by a solid line curve h during a single rotation of the crankshaft in the engine operating condition, the selection is made such that the initiation of the fuel injection effected in synchronism with the suction strokes of the first and the fourth cylinders is altered so as to be performed in synchronism with the suction strokes of the second and the third cylinders. Then, the signal waveform of the output from the $O_2$-sensor will be changed over to one indicated by a broken line curve i from the solid line curve h. Thus, the output signal from the $O_2$-sensor after the alternation of the reference cylinders for the synchronization of the fuel injection is approximated to the preset value g.

In this case, the output variation represented by the solid line curve h may be approximated to the preset value g by deviating the fuel injection initiating timing for a small crank rotation angle.

The selection or change-over of the fuel injection modes described above may be effected by detecting that the revolution number of the engine 1 has increased beyond a predetermined value, or by detecting that the pressure in the intake conduit or the aperture of the throttle valve representative of the revolution number of the engine has attained a predetermined level or angle, or alternatively by utilizing the output signal from the hot-wire sensor which serves for detecting the suction air quantity.

In brief, a given one of those detected values may be compared with the associated preset values stored in ROM 504 of the control system 500, to thereby identify the current operating or running state of the engine, i.e. whether the engine is in a high speed operating condition or a low speed operating condition and correspondingly change over the two fuel injection modes described above from each other.

The timing for changing over the fuel injection modes should preferably be determined also in consideration of the configuration of the intake conduit or manifold 106, the shape of the combustion chamber formed in the individual cylinders, the configuration of the charging valve, or like factors which also influence the fuel distribution pattern.

Figure 10:
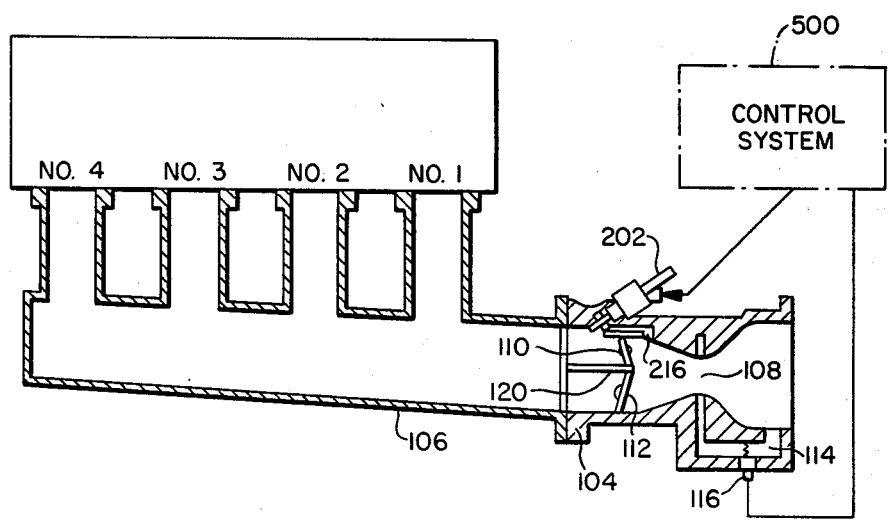
FIG. 10 shows a general arrangement of the fuel injection system according to another embodiment of the invention.

FIG. 10 shows schematically a general arrangement of the fuel injection system according to another embodiment of the invention. This system is different from the one shown in FIG. 1 in that the individual cylinders are arranged in a row in parallel to the intake conduit 106 and that the suction air metering cylinder provided with the fuel injection valve device 202 is arranged in a linear alignment with the intake conduit 106 at one end thereof. In FIG. 10, the same elements as those shown in FIG. 1 are denoted by the same reference numerals.

In the arrangement in which the individual cylinders are positioned in a row in parallel to the intake conduit 106 such as shown in FIG. 10, the distance between the inlet opening of the intake conduit 106 and the individual cylinders becomes different for the individual cylinders, as the result of which the time required for the injected fuel, i.e. the injected fuel air mixture in the strict sense to reach the individual cylinders, becomes different if the fuel injection is effected at a constant time interval, whereby there arise differences in the fuel quantity charged into the individual cylinders at the suction strokes thereof together with differences in the fuel concentration of the fuel air mixture fed to the individual cylinders.

Accordingly, the fuel injection system according to another embodiment of the invention is constructed in such manner that the initiation of the fuel injection is effected by varying the timing.

More specifically, the control is effected such that the fuel injection initiating timing for the cylinder, e.g. the fourth cylinder which is located most remotely from the fuel injection valve device 202 is advanced, while the fuel injection initiating timing for the cylinder (e.g. the first cylinder) located nearest to the fuel injection valve device 202 is delayed, thereby to assure an equal fuel concentration of the fuel air mixture for all the cylinders of the engine.

In this conjunction, it is noted that the fuel injection initiating timing becomes different in dependence on the instant revolution number of the engine. Accordingly, it is preferred that the fuel injection initiating timing data for dealing with the variation in the engine crankshaft revolution speed be previously stored in a memory such as ROM 504, for example. Then, the optimum fuel supply can be accomplished over the entire operating range.

A relationship between the fuel injection timing and the beginning of the suction stroke at the individual cylinders in the fuel injection system shown in FIG. 10 is illustrated in the diagram of FIG. 3 at E.

Referring to FIG. 3 at E, assuming that the fuel injection is initiated in synchronism with the suction strokes at the first and the fourth cylinders, the initiation of the fuel injection for the suction stroke of the first cylinder No. 1 located nearest to the fuel injection valve device 202 is effected with a delay $T_1$ in terms of the crank angle with reference to the upper dead point. On the other hand, the fuel injection for the fourth cylinder which is assumed to be located remotest from the fuel injection valve device is initiated with a delay $T_2$ with reference to the upper dead point, where $T_2 > T_1$. The initiation of the fuel injection controlled in this manner is realized by the control system 500.

In this connection, the fuel injecting time duration $\Delta t$ is assumed to be constant.

In the case of the fuel injection system described just above, the fuel injection initiating timing is regulated with reference to the upper dead point in dependence on the locations of the selected cylinders with a view to cancelling out the different lags which would otherwise occur in the fuel transportation to the individual cylinder. However, substantially the same effect can attained by regulating the fuel injecting duration in dependence on the locations of the selected cylinders with the fuel injection initiating timing with reference to the upper dead point being set constant (at T, for example).

More specifically, for the suction stroke at the first cylinder located nearest to the fuel injection valve device 202, the fuel injection is initiated at the constant crank angle T from the upper dead point and accomplished within the injecting time duration $\Delta t_1$. On the other hand, for the suction stroke at the fourth cylinder located remotest from the fuel injection valve device 202, the fuel injection is initiated at the constant crank angle T from the upper dead point and terminated after lapse of an injecting time duration $\Delta t_2$, where $\Delta t_2 > \Delta t_1$, as shown in FIG. 3. In this way different lags in the fuel transporation to the individual cylinders can be compensated.

The principle of the fuel injecting system according to which the fuel injecting duration is varied can be applied also to the fuel injecting system in which the fuel injection is initiated in synchronism with the suction strokes of the individual cylinders.

More specifically, the fuel injection is initiated in synchronism with the reference crank angle pulse (FIG. 3, G) produced for every increment of 180° in the crank angle, as is shown in FIG. 3 at B, while at the same time the fuel injecting time duration $\Delta t_1$ for the particular cylinders such as the first and the fourth cylinders may be selected to be shorter than the injecting duration $\Delta t_2$ of the other cylinders such as the second and the third cylinders, for example, whereby possible lag in the fuel transporation to the individual cylinders can be obviated, resulting in that an optimum or uniform distribution of the fuel can be accomplished.

Figure 11:
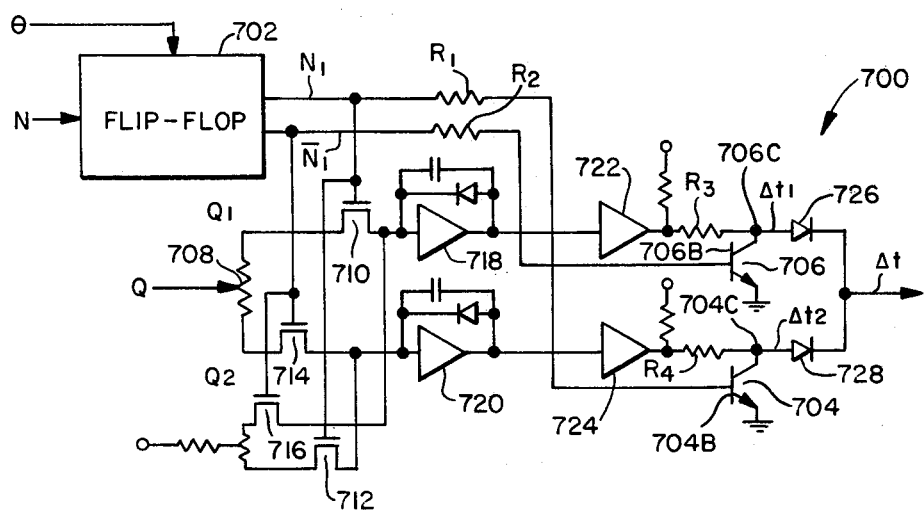
FIG. 11 is a circuit diagram to show the control circuit for controlling the fuel injecting operation of the fuel injection system according to another embodiment of the invention.
Figure 12:
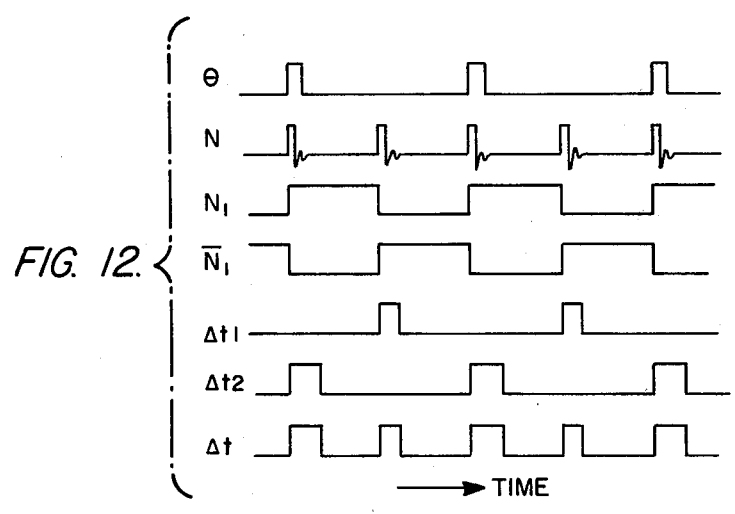
FIG. 12 is a signal diagram to illustrate various signals appearing at various points in the control circuit shown in FIG. 11.

Next, referring to FIGS. 11 and 12, description will be presented of an exemplary circuit arrangement of the fuel injection control system which operates on the basis of the principle mentioned above.

When a crank angle signal $\theta$ (FIG. 12) produced from the crank angle detector 314 shown in FIG. 1 (this signal corresponds to the initial pulse signal shown in FIG. 5 at C, which is produced by the initial pulse generator circuit 608 shown in FIG. 4 in correspondence to the suction strokes of the first and the fourth cylinders) and a revolution number (crankshaft speed) signal N (which is produced in synchronism with the reference crank angle signal CRP supplied to the initial pulse generator circuit 608 shown in FIG. 4) are supplied to a flip-flop 702, a pair of output signals $N_1$ and $\overline{N}_1$ (refer to FIG. 12 at $N_1$ and $\overline{N}_1$) are produced from the flip-flop 702.

One of the paired output signals $N_1$ and $\overline{N}_1$ (in this case, the signal $N_1$) is applied to a base electrode 704B of a transistor 704 through a resistor $R_1$, while the other signal $\overline{N}_1$ is applied to a base electrode 706B of a transistor 706 through a resistor $R_2$.

On the other hand, an air flow signal Q detected as an analog quantity from the hot-wire sensor 116 is applied to a variable tap resistor 708 and divided into a pair of signals $Q_1$ and $Q_2$ appearing at both ends of the variable tap resistor 708. The dividing ratio for the air flow signals $Q_1$ and $Q_2$ is previously determined on the basis of the output signal from the $O_2$- sensor 406 or the like so that the fuel quantity, i.e. the fuel air ratio of the mixture distributed to the individual cylinders becomes uniform or optimum for all of these cylinders.

The air flow signals $Q_1$ and $Q_2$ are applied to integrators 718 and 720, respectively, through associated gates 710, 712 and 714, 716 which are controlled by the output signals $N_1$ and $\overline{N}_1$ from the flip-flop circuit 702, respectively.

The output signals from both integrators 718 and 720 are coupled through amplifies 722, 724 and applied to the collector electrodes 706C and 704C of transistors 706 and 704 through resistors $R_3$ and $R_4$.

There are produced from the output terminals of the transistors 706 and 704 the time duration signals $\Delta t_1$ and $\Delta t_2$ shown in FIG. 12.

In dependence on the pulse position of the crank angle signal constituted by pulses each produced for every complete rotation of the crank shaft (FIG. 12, $\theta$) the suction strokes of the first and the fourth cylinders can be discriminated from those of the second and the third cylinders. When the crank angle signal $\theta$ shown in FIG. 12 corresponds to the sunction strokes of the first and the fourth cylinders, the pulse $\Delta t_1$ corresponds to the suction stroke of the second and the third cylinders, while the pulse $\Delta t_2$ corresponds to the sunction stroke of the first and the fourth cylinders.

These output signals $\Delta t_1$ and $\Delta t_2$ are added together through diodes 726 and 728, respectively, thereby to constitute a final output signal $\Delta t$.

The pulse width of the output signal $\Delta t$ thus obtained from the control circuit 700 can be given by the following expression:

$$\Delta t = K \cdot Q / N \quad (1)$$

where K represents a proportionality constant.

By means of the output signal $\Delta t$, the energizing duration $\Delta t$ of the electromagnetic or solenoid injection valve of the fuel injection valve device 202 is controlled in correspondence to the suction stroke of the individual cylinder.

The solenoid valve energizing duration $\Delta t$ corresponding to the suction stroke of the individual cylinder is preset in dependence on the dividing ratio for the air flow signals $Q_1$ and $Q_2$ obtained by dividing the air flow signal Q by the variable resistor 708. The dividing ratio in turn is determined on the basis of the output signal from the $O_2$-sensor 406 mounted in the exhaust pipe 402.

For example, assuming that the fuel air ratio of the mixture fed to the first and the forth cylinders is higher than that of the mixture fed to the second and third cylinders, the dividing ratio for producing the air flow signals $Q_1$ and $Q_2$ is so selected that the fuel injecting time duration $\Delta t_2$ at the suction strokes of the first and fourth cylinders becomes longer than the fuel injecting time duration $\Delta t_1$ at the suction strokes of the second and third cylinders, whereby the fuel air ratio of the mixture supplied to the individual cylinders is equalized.

Figure 13:
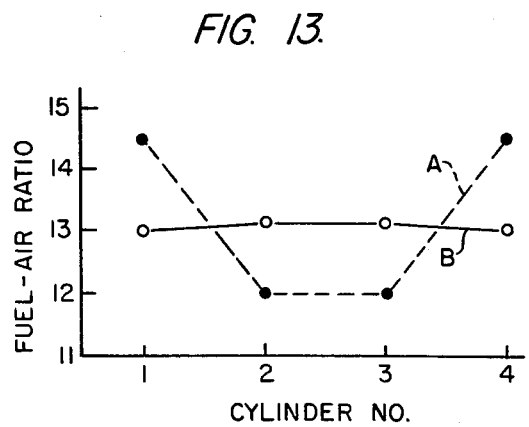
FIG. 13 graphically illustrates experimentally obtained data for the fuel air ratio distribution in the fuel injection system according to a further embodiment of the invention.

Experimental results obtained in a four-cycle four-cylinder engine operated at 1200 r.p.m. are graphically illustrated in FIG. 13. It can be seen that the fuel air ratio distribution attained in the fuel injection system described above and represented by a curve B is far more uniform than the one attained in a hitherto known fuel injection system represented by a curve A.

In FIG. 13, the individual cylinders No. 1 to No. 4 are plotted along the abscissa with the fuel air ratio A/F plotted along the ordinate.

Although the foregoing description has been made on the assumption that the internal combustion engine is of a four-cycle and four-cylinder type, it will be appreciated that the invention is not restricted to such engine but can be equally applied to a six-cylinder engine or an eight-cylinder engine.

In the case of a six-cylinder engine, the fuel injection timing as well as the fuel injecting duration can be controlled so as to assure a uniform fuel distribution to the individual cylinders by adjusting the fuel injection initiating timing and the fuel injecting duration in dependence on the operating conditions.

What is claimed is:

1. A fuel injection system for an internal combustion engine, comprising a single fuel injecting means for supplying the fuel to a plurality of cylinders of said engine, and control means for controlling said single fuel injection means in such a manner that the fuel injected from said single fuel injecting means is injected by responding to every two suction strokes of said plurality of cylinders, said control means including means for defining the timing of commencement of the injection of fuel in such a manner so as to establish a uniform distribution of fuel supplied to the cylinders among the respective cylinders.

2. A fuel injection system for an internal combustion engine according to claim 1, further including means for detecting operating conditions of said plurality of cylinders, wherein said fuel injecting means is adapted to initiate the fuel injection in response to a signal which is produced by said control means in response to the signal output from said detecting means and represents a determined fuel injection initiating timing.

3. A fuel injection system for an internal combustion engine according to claim 2, wherein said fuel injecting means is adapted to inject fuel in response to a signal which is produced from said control means in response to the signal output from said detecting means and represents a determined fuel injecting time duration.

4. A fuel injection system for an internal combustion engine according to claim 3, wherein said control means includes an injecting time setting circuit for setting previously the fuel injecting time duration of said fuel injecting means, a second signal output circuit for producing a signal in response to the signal output from said detecting means, and a second comparator circuit for comparing the set value preset in said injecting timing setting means with the signal value output from said second signal output means, the signal commanding said fuel injecting time duration being produced as an output signal from said second comparator circuit.

5. A fuel injection system for an internal combustion engine according to claim 2, wherein said detecting means includes suction air flow metering means for metering a quantity of air supplied to said plural cylinders and position detecting means for detecting positions of the pistons within said cylinders at the respective suction strokes, said control means being adapted to produce a signal representative of a preset fuel injecting initiating timing to said fuel injecting means in response to the signals output from said suction air flow metering means and said position detecting means.

6. A fuel injection system for an internal combustion engine according to claim 5, wherein said suction air flow metering means in disposed at one side of a suction air flow metering cylinder which is communicated to said plural cylinders at the other side thereof, and said fuel injecting means is singularly disposed at said other side of said suction air flow metering cylinder.

7. A fuel injection system for an internal combustion engine according to claim 5 or 6, wherein said suction air flow metering means is located in a bypass passage formed at an upstream portion of said suction air flow cylinder communicated to said plural cylinders through an intake conduit, said fuel injecting means in disposed singularly at a downstream portion of said suction air flow metering cylinder so that fuel is injected into said plural cylinders through said intake conduit.

8. A fuel injection system for an internal combustion engine according to claim 7, wherein said suction air flow metering means includes a hot-wire sensor, while said fuel injecting means includes a single fuel injector.

9. A fuel injection system for an internal combustion engine according to claim 7, wherein said control means includes an injecting time setting circuit for setting previously the fuel injecting time duration of said fuel injecting means, a second signal output circuit for producing a signal in response to the signal output from said detecting means, and a second comparator circuit for comparing the set value preset in said injecting timing setting means with the signal value output from said second signal output means, the signal commanding said fuel injecting time duration being produced as an output signal from said second comparator circuit.

10. A fuel injection system for an internal combustion engine according to claim 5, wherein said position detecting means includes crank angle detecting means for detecting angular position of the engine crank at the suction strokes of said plural cylinders.

11. A fuel injection system for an internal combustion engine according to claim 2, wherein said control means comprises operational processing means for producing the preset fuel injection initiating timing signal in response to the signal output from said detecting means, and signal input/output means for transferring the signal output from said detecting means to said operational processing means and transferring the signal output from said operational processing means to said fuel injecting means.

12. A fuel injection system for an internal combustion engine according to claim 2, wherein said control means comprises an injection initiating timing setting circuit for setting previously the fuel injection initiating timing of said fuel injection means, a first signal output circuit for producing a signal in response to the signal output from said detecting means, and a first comparator circuit for comparing the preset value set in said injecting timing setting means with the signal value output from said first signal output means, said signal commanding said fuel injection initiating timing being produced as an output signal from said first comparator circuit.

13. A fuel injection system for an internal combustion engine according to claim 1, wherein said fuel injecting means is singularly disposed with interposition of an intake conduit at one side of an array of said plurality of cylinders arrayed in a row in a predetermined order, said control means being adapted to regulate the fuel injection initiating timing in dependence on distance between said fuel injecting means and the cylinder into which the fuel is to be injected.

14. A fuel injection system for an internal combustion engine according to claim 1, wherein said fuel injecting means is singularly disposed with interposition of an intake conduit at one side of an array of said plurality of cylinders arrayed in a row in a predetermined order, said control means being adapted to regulate fuel supply time duration in dependence on distance between said fuel injecting means and the cylinder into which the fuel is to be injected.

15. A fuel injection system for an internal combustion engine according to claim 1, wherein said detecting means includes temperature detecting means for detecting temperature of a coolant for cooling said plural cylinders, said control means being adapted to respond to the signal output from said temperature detecting means thereby to regulate said fuel injecting time duration.

16. A fuel injection system for an internal combustion engine according to claim 2, wherein said control means is adapted to respond to the signal output from said detecting means thereby to control said fuel injecting means so that the cylinders to which fuel is to be injected can be changed over to one another.

17. A fuel injection system for an internal combustion engine according to claim 2 or 16, wherein said detecting means includes exhaust gas detecting means for detecting exhaust gas discharged from said plural cylinders, said control means being adapted to respond to the signal output from said exhaust gas detecting means thereby to control said fuel injecting means so that the cylinders to which fuel is to be injected can be changed over to one another.

18. A fuel injection system for an internal combustion engine according to claim 16, wherein said exhaust gas detecting means includes an $O_2$-sensor.

19. A fuel injection system for an internal combustion engine according to claim 1, wherein said control means is adapted to control said fuel injecting means so that fuel is injected from said fuel injecting means once for two suction strokes of said plural cylinders.

20. A fuel injection system for an internal combustion engine according to claim 1 or 19, wherein said plurality of cylinders comprises four cylinders in which the suction strokes are repeated in the order of a first, a third, a fourth and a second cylinder, said control means being adapted to control said fuel injecting means such that fuel injection to said first and fourth cylinders takes place when said first and fourth cylinders are at the suction stroke.

21. A fuel injection system for an internal combustion engine according to claim 20, wherein said control means being adapted to change said first and fourth cylinders to which fuel is to be injected over to said third and second cylinders in dependence on operating conditions of said engine.

22. A method of operating a fuel supply system for an internal combustion engine having a plurality of cylinders and a single point type fuel supply device coupled to all of said cylinders for supplying fuel thereto, wherein the time of initiation of said fuel supply device is defined relative to the suction stroke of a piston within a cylinder, comprising the step of:

causing said single point fuel supply device to supply fuel to said cylinders for a predetermined period of time repetitively, every other suction stroke of a piston within a selected cylinder, the time of initiation of said supply of fuel being established so as to make the fuel distribution to the individual cylinders uniform.

23. A fuel injection system for an internal combustion engine, comprising a single fuel injecting means for supplying fuel to a plurality of cylinders, and control means adapted to control said single fuel injecting means so that fuel is injected from said single fuel injecting means individually to the said cylinders for every suction stroke of said plurality of cylinders and at the same time to regulate for every cylinder a fuel injecting time duration during which fuel is injected to said individual cylinder in dependence on operating conditions of said engine, said control means including cylinder discriminating means for identifying the cylinder whose fuel injecting time duration is to be regulated, and injection time ratio setting means for responding to a signal output from said cylinder discriminating means thereby to preset the ratio of fuel injecting time durations between the cylinders whose fuel injecting time duration is to be regulated and the other cylinders in dependence on operating conditions of the engine, and further comprising suction air quantity detecting means for detecting the quantity of air supplied to said plural cylinders, and crank angle detecting means for detecting the position of pistons within said cylinders at each of said suction strokes in terms of crank angle, wherein said cylinder discriminating means is adapted to respond to a single output from said crank angle detecting means, while said fuel injecting time ratio setting means is adapted to respond to a single output from said suction air quantity detecting means.

24. A fuel injection systemn for an internal combustion engine according to clain 23, wherein said cylinder discriminating means is adapted to respond to a signal output fromm said crank angle detecting means thereby to prepare first and second output signal which are supplied to first and second control circuits, respectively, while said fuel injecting time ratio setting means is adapted to respond to a signal output from said suction air quantity detecting means thereby to prepare third and fourth output signals which are applied to said first and second control circuits, respectively, said first and second control circuits being adapted to respond to said first, second, third and fourth output signals thereby to prepare first and second fuel injecting time duration signals having the ratio preset in said injecting time ratio setting means.

25. A fuel injection system for an internal combustion engine according to claim 24, further comprising a flip-flop circuit for responding to the signal output from said crank angle detecting means thereby to producing first and second signals, first and second transistor circuits including first and second transistors having base electrodes supplied with said first and second signals output from said flip-flop circuit, respectively, a variable resistor for responding to the signal output from said suction air quantity detecting means thereby to divide said signal into the third and fourth signals at a predetermined ratio, and first and second gate circuit for controlling said first and second transistor circuits so that said third and fourth output signals are applied to the collector electrodes of said first and second transistors.

* * * * *